United States Patent [19]
Tompkin et al.

[11] 3,868,468
[45] Feb. 25, 1975

[54] PREPARATION OF A SHELF STABLE PRE-COOKED BACON PRODUCT

[75] Inventors: Robert B. Tompkin, Lagrange; Francis G. Connick, Downers Grove, both of Ill.

[73] Assignee: Swift & Company, Chicago, Ill.

[22] Filed: Dec. 4, 1972

[21] Appl. No.: 311,960

[52] U.S. Cl............ 426/243, 426/266, 426/382, 426/388, 426/392, 426/396, 426/399, 426/480
[51] Int. Cl............................................ A22c 18/00
[58] Field of Search ........... 426/107, 110, 113, 149, 426/243, 264, 265, 266, 324, 392, 396, 399, 410, 413, 415, 382, 388, 480

[56] References Cited
UNITED STATES PATENTS
| | | | |
|---|---|---|---|
| 2,974,047 | 3/1961 | Holmes | 426/264 |
| 3,220,854 | 11/1965 | Zwart | 426/264 |
| 3,321,314 | 5/1967 | Jeppson | 426/243 |
| 3,429,713 | 2/1969 | Nelson | 426/243 |

*Primary Examiner*—Hyman Lord
*Attorney, Agent, or Firm*—Edward T. McCabe; Charles E. Bouton; W. C. Davis

[57] ABSTRACT

An improved method for producing a pre-cooked sliced bacon product that is shelf stable at ambient temperature, yet contains only a palatable level of sodium chloride throughout each slice of product is disclosed. Bacon slices, prepared and cured in a conventional manner, are cooked to a constant weight yield of between about 30%–40% and are packaged in a manner whereby the resulting cooked product has a water activity of below about .86 maximum, a percent brine level of at least 13%, and a maximum sodium chloride level of 4% through out each slice. The resultant packaged product does not support the growth of spoilage and/or pathogenic microbial organisms at ambient temperatures and can easily be prepared for consumption.

6 Claims, No Drawings

PREPARATION OF A SHELF STABLE PRE-COOKED BACON PRODUCT

This invention relates to the food art and more particularly pertains to an improved process for the preparation of a shelf stable pre-cooked bacon product.

The necessity for food manufacturers to provide food products that have convenience of preparation is becoming more and more important in view of the increasing mobility of our society. This appears to be particularly valid in the case of common breakfast food items which consume considerable time in proper preparation. An example is fried or broiled bacon.

Bacon is commonly merchandised as a cured meat product in sliced form under refrigeration or in a frozen condition. However, the popularity of sliced bacon as a food item in the home or commercial eating establishment has suffered from its many shortcomings in storage and preparation. It is mandatory to merchandise the product at reduced temperatures so as to reduce its susceptibility to microbial spoilage during storage. In addition, bacon must be cooked, by frying, broiling, etc. prior to consumption. During cooking, bacon produces a high percentage of waste fat, odiferous fumes, grease spattering and the like and must be carefully tended to assure proper preparation.

There are a few pre-cooked sliced bacon products presently being merchandised. These pre-cooked products have advantages over so-called "raw" sliced bacon for they can be prepared for consumption by merely heating to a desired eating temperature or used as is. In addition to preparation time savings, the pre-cooked products eliminate the disadvantages of producing waste fat, cooking fumes, etc. associated with "raw" bacon cooking.

Generally, prior art processes for preparing pre-cooked bacon include cooking sliced bacon, cured and prepared in a conventional manner well known in the art, to about 25–45% weight yield and packaging the product in a container. When pre-cooked to the designated yield the prior art products can easily be prepared for consumption by heating to the desired serving temperature without experiencing the above-described disadvantages.

However, pre-cooked bacon products prepared by most prior art processes, have the disadvantage of having to be merchandised under refrigeration or in a frozen condition. Some bacon slices, even when cooked to about 30% weight yield, are susceptible to spoilage when held at ambient temperatures. Apparently this is due to the fact that slices from certain parts of bacon bellies or slabs contain a high level of lean meat which retains adequate moisture through cooking to support the growth of microbial organisms that produce the spoilage condition. Refrigeration and/or freezing of the bacon product retards the growth of spoilage microorganisms. On the other hand, refrigeration and/or freezing severely restrict the marketability and storage times of the product.

There is one prior art pre-cooked bacon product which is known to be shelf stable. That is, the product can be merchandised and stored at ambient temperatures for considerable lengths of time without becoming spoiled by microbial growth. This product is prepared in a manner substantially the same as described hereinbefore for the refrigerated pre-cooked bacon products except that the bacon bellies or slabs are injected with very high levels of sodium chloride to provide a resultant pre-cooked bacon slice having at least a 5%–10% by weight sodium chloride content. However, due to such a high sodium chloride level, the pre-cooked slices must be soaked in water or diluted with other food products prior to preparation and consumption. The soaking in water or product dilution reduces the sodium chloride level to a palatable range which is considered by those skilled in the art to be about 4% sodium chloride, maximum, by weight of product.

On the other hand, we have discovered a process for producing a pre-cooked sliced bacon product which is shelf stable yet which contains a sodium chloride level within the range of human palatability, i.e., below about 4% by weight sodium chloride content. The product can be marketed and stored at ambient temperatures without deterioration. Moreover, the product does not support the growth of spoilage or pathogenic microorganisms during storage and can easily be prepared for consumption by heating to a desirable serving temperature or serving as is.

Accordingly, it is an object of the invention to present an improved process for producing a pre-cooked sliced bacon product that is shelf stable at ambient temperatures and contains only a palatable level of sodium chloride.

It is another object of the present invention to provide a process for preparing a pre-cooked containerized sliced bacon product having a maximum salt level of below about 4% by weight throughout each slice that will not support the growth of spoilage and/or pathogenic microorganisms when stored at ambient temperatures.

It is still another object of the invention to present an improved method of preparing a containerized pre-cooked sliced bacon product wherein cooked bacon slices, cooked to a constant percent yield of between about 30%–40%, are selected and packaged in a container in a manner whereby the resulting containerized product has a water activity and percent brine level that will not support microbial growth at ambient temperatures, and said product contains only a palatable level of sodium chloride in each individual bacon slice.

Other objects, if not set forth specifically herein, will be readily apparent to those skilled in the art from a reading of the following detailed description of the invention.

Generally, the instant invention relates to a method for producing a shelf stable pre-cooked sliced bacon product which contains only a palatable level of sodium chloride in each individual slice. Bacon slabs, i.e., pork bellies prepared and cured by any conventional manner known in the art, are sliced to a desired thickness. The bacon slices are cooked to a constant percent weight yield of between about 30–40%. A plurality of the cooked slices are packaged in a container in a manner that inhibits mold growth and will produce throughout the resultant containerized product a water activity of below about .86 maximum and a percent brine level of at least about 13%, and each of the bacon slices of said product having below about 4% sodium chloride, by weight. The resultant product is shelf stable, i.e., does not support the growth of spoilage and/or pathogenic microorganisms when stored at ambient temperatures, and can conveniently be prepared for consumption by heating to a desired serving temperature or served as is.

More particularly, the inventive method comprises cooking conventionally prepared and cured bacon slices to a constant yield of about 30%–40% (60%–70% shrink) by weight, selecting an equal plurality of cooked slices from each butt, center, center and flank quadrant of at least one bacon slab, and packaging the selected slices in a container in the absence of air. By following this critical sequence of steps, we have found that the resultant containerized bacon product will have a water activity of below about .86 maximum, a percent brine level of at least 13%, and a sodium chloride level below about 4%, by weight, throughout each individual slice of product.

It is well known that water is an essential requirement for the growth of all microorganisms. The availability of water for microbial growth is more closely related to its relative vapor pressure or water activity than to the percent water present. Water activity ($A_w$) is defined as the ratio of water vapor pressure of a system under consideration (P) to vapor pressure of pure water $P_o$ at the same temperature, and is represented by the following formula: $A_w = P/P_o$. When the moisture concentration of the system is in equilibrium with the relative humidity (RH) of its environment, water activity is directly related to relative humidity expressed in percent, e.g., $A_w = RH/100$.

Research has shown that containerized food products having a water activity above about .86 are susceptible to microbial spoilage when stored at ambient temperatures. Accordingly, it is accepted by those skilled in the art that containerized products properly packaged and exhibiting a water activity below about .86 will not support the growth of spoilage and/or pathogenic microorganisms when stored at ambient temperatures.

We have found that there is a direct relationship between water activity and percent brine level (% brine = % Na Cl/% $H_2O$ + % Na Cl) in cooked bacon slices. This relationship is reciprocal, i.e., the lower the water activity of the product, the higher the percent brine level. Tests have shown that, in order to be shelf stable at ambient temperatures, a containerized pre-cooked sliced bacon product must have a water activity of .86 or below and a corresponding percent brine level of at least 13%.

Cooking sliced bacon, cured and prepared in a conventional manner, to a constant percent weight yield of between about 30%–40% will normally provide a water activity of .86 maximum and a percent brine level of at least 13% in only some of the bacon slices. This will be explained more fully hereafter. However, cooking bacon slices to a yield above 40% will not produce the required water activity and percent brine level. Such a product is not shelf stable. On the other hand, bacon slices cooked to below about 30% yield are very brittle and it is most difficult to package and merchandise them without breakage. Hence, in the practice of the instant invention, the bacon slices are cooked to provide the above-described constant per cent of weight yield.

We prefer to cook bacon slices to a constant percent weight yield of about 32–35%. Slices cooked to within this range exhibit less tendency to support microbial growth at ambient temperatures. That is to say, slices cooked to within this range, when properly packaged in containers in accordance with the instant invention, provide resultant containerized products having a preferred water activity of about .80 to about .85 and a preferred percent brine level of about 13.0% to about 16.0%. Moreover, such slices can easily be packaged and marketed without product breakage.

In the practice of the invention, bacon slices can be cooked in any manner known in the art, e.g., broiling, infrared, pan frying, deep fat frying and the like. Preferably we use an infra-red cooking apparatus in combination with the variable speed conveyor, both of which are well known in the art. By the use of such apparatus, bacon slices can be continuously cooked to any desired constant percent weight yield.

As stated hereinbefore, even when bacon slices are cooked to a constant percent weight yield of between about 30–40%, at least some of said slices do not exhibit a water activity and/or percent brine level that will not support microbial growth. Apparently this difficulty is caused by the tremendous variation of lean meat to fat ratio in bacon slices. The lean meat to fat ratio may vary as much as 30% between slices taken from the same bacon slab or belly.

The major portion of moisture in bacon slices is retained in the lean meat portion. Hence, a bacon slice having a high lean composition, will exhibit a high water activity and low percent brine level and a slice having a low lean composition will exhibit a low water activity and high percent brine level when the slices are cooked to a constant percent weight yield and compared to each other.

We have discovered that this difficulty can be overcome by carefully selecting an equal plurality of cooked slices from each flank center, center and butt quadrant of at least one bacon slab and packaging the selected slices in a single container in a manner which will also inhibit mold growth. As illustrated in the following examples, bacon slices from each quadrant of a bacon slab, cooked to a constant yield of about 30–40% by weight, exhibit different water activities and percent brine levels. Cooked slices selected from butt and flank quadrants normally have a water activity above about .86 and a per cent brine level below about 13% when cooked to the above-designated constant yields. Accordingly, cooked slices from center quadrants normally have a water activity below about .86 and a percent brine level of at least 13%. This is apparently due to the fact that slices from the butt and flank quadrants are composed of higher lean meat than slices from said center quadrants.

In any event, we have found that when an equal number of slices from each of the above-designated quadrants are packaged in a single container the resultant containerized product has a water activity of below about .86 and a percent brine level of at least 13% and a sodium chloride level below about 4% by weight throughout each of the bacon slices. This occurs after holding the containerized product after sealing, for example, about 12 hours. Apparently, there is a migration of moisture between the slices having differing water activities as they are confined in the common environment until an equilibrium is obtained throughout.

Although bacon slabs or bellies which have been prepared and cured by any conventional process known in the art can be utilized in the practice of the instant invention, we prefer to use bacon slabs that have been pumped with a 100° saturated brine solution to a level about 110–120% green weight. The use of bacon slabs prepared in this manner in the instant invention provides the preferred percent brine level in the resultant containerized product and, accordingly, provides the resultant product with a palatable sodium chloride level of below about 4% by weight within each slice.

The equal plurality of cooked slices from each flank, center, center and butt quadrant may be packed in any type of a container. However, it is essential that the selected slices be packaged in containers in a manner that will inhibit or retard mold growth in the resultant containerized product. This can be accomplished by any process or technique known in the art, e.g. packaging in the absence of air, in the presence of an inert gas or antimycotic material or the like. We prefer to package the selected cooked slices in a metal container either by sealing the container under maximum vacuum or by back-filling the evacuated container with nitrogen and then sealing it.

The examples which follow describe specific embodiments of the invention. These examples are set forth herein only for the purpose of illustration and should not be considered as including any limitation on the invention.

EXAMPLE 1

Pork bellies, skinned and trimmed of excess fat and muscle were pumped to 115% green weight with a 100° saturated brine pickle solution containing butylated hydroxyanisole, butylated hydroxytoluene and a trace of commercial liquid smoke for a 110-111% green weight retention by the use of an Anco Injector, manufactured by Albright-Nell Corp. The pumped bellies were hung directly after pumping and placed into a smoke house. The bellies were cooked and smoked to about 128° F. internal temperature and removed to refrigerated coolers. The cooked bellies were chilled to about 26°F., taking about 24 hours. The chilled bellies were then pressed into slabs and the slabs sliced to provide slices weighing about .25 ounce each by the use of conventional bacon pressing and slicing devices. The slices were placed on a continuous conveyor of a conventional infra-red cooking apparatus. The slices were cooked for a time period sufficient to produce a constant percent weight shrink of 65% (35% yield). An equal number of cooked slices from each butt, center, center and flank quadrant of the bacon slabs were selected, placed on silicone treated paper and packaged in a metal container while still in a heated condition. The metal container was immediately sealed under maximum vacuum.

After holding for a period of about 12 hours, the containerized product was opened and analyzed for water activity, percent brine level and percent sodium chloride. Water activity was measured by the use of a device manufactured by Hygro Dynamics, Inc. and merchandized under the tradename Hygro Sensor. Upon analysis, the resultant pre-cooked bacon product had an average water activity of .834, a percent brine level of 13.9% and a sodium chloride level of 3.2%, by weight. No individual slice from the containerized product that was analyzed exhibited a water activity above .86, a percent brine level below 13.0% and a salt level above 4%, by weight.

EXAMPLE II

Three bacon slabs, prepared and cured in accordance with the procedure set forth in Example I, were sliced to provide slices weighing about .25 ounces each. The slices were cooked in an infra-red cooker apparatus to a constant yield of about 35% weight. Two slices from the center of each butt, center, center, and flank quadrant from each bacon slab were selected and packaged under maximum vacuum in a metal container while said slices were still in a heated condition. After holding overnight, the containers were opened and the sliced products were analyzed for percent sodium chloride, percent moisture, percent fat, percent brine and water activity ($A_w$). The following tables illustrate the results of analysis of the slices from each of the three bacon slabs.

TABLE 1

| BACON SLAB A | % NaCl | %H$_2$O | % Fat | % Brine | $A_w$ |
|---|---|---|---|---|---|
| Flank | 3.2 | 26.0 | 37.9 | 11.0 | .875 |
| Center | 3.0 | 18.5 | 49.5 | 13.9 | .835 |
| Center | 3.3 | 17.2 | 53.4 | 16.2 | .83 |
| Butt | 3.4 | 24.1 | 45.7 | 12.7 | .875 |

TABLE 2

| BACON SLAB B | % NaCl | %H$_2$O | % Fat | % Brine | $A_w$ |
|---|---|---|---|---|---|
| Flank | 3.7 | 24.3 | 37.2 | 13.2 | .85 |
| Center | 3.7 | 16.6 | 48.2 | 18.5 | .775 |
| Center | 3.2 | 16.9 | 49.7 | 15.8 | .805 |
| Butt | 2.9 | 29.6 | 35.8 | 9.05 | .895 |

TABLE 3

| BACON SLAB C | % NaCl | %H$_2$O | % Fat | % Brine | $A_w$ |
|---|---|---|---|---|---|
| Flank | 3.5 | 25.0 | 38.6 | 12.3 | .865 |
| Center | 3.4 | 17.8 | 49.6 | 16.0 | .81 |
| Center | 3.1 | 18.5 | 48.9 | 14.35 | .815 |
| Butt | 2.8 | 24.9 | 41.2 | 10.1 | .885 |

As Tables 1–3 indicate, cooked bacon slices from flank and butt quadrants of a bacon slab have water activities above .86 and percent brine levels below 13.0%. The slices from the two center quadrants have water activities below .86 and percent brine levels above 13%. Nevertheless, all slices have a percent sodium chloride level below 4%, by weight.

EXAMPLE III

Three bacon slabs were prepared in accordance with the procedure described in Example I. Two slices from each flank, center, center, and butt quadrant of each belly were selected. The slices from each of the three bellies were cooked by the process of Example I to constant percent weight yield of 35%, 40% and 45%, respectively. The selected slices from each bacon slab were packaged in a container under maximum vacuum and held overnight. The three resultant containerized products were then analyzed for water activity, percent brine level and per cent sodium chloride. The results are set forth in the following Table 4.

TABLE 4

| Cook Yield | $A_w$ | % Brine | % NaCl |
|---|---|---|---|
| 35% | .818 | 15.65 | 3.9 |
| 40% | .860 | 13.77 | 3.2 |
| 45% | .871 | 12.41 | 3.15 |

As illustrated in Table 4, the containerized products containing bacon slices cooked to constant yields of 35% and 40% respectively, have water activities and percent brine levels within the ranges that will not support the growth of microbial organisms. However, the containerized product comprised of bacon slices cooked to 45%, by weight, constant yield, is without said ranges.

EXAMPLE IV

Bacon slabs were prepared and cured in accordance with the procedure disclosed in Example I. The slabs were stacked vertically in series of three and sliced to provide slices weighing approximately .25 ounces each. Series of three slices were placed, as continuously sliced, onto a conveyor of a conventional infra-red cooker apparatus and cooked to a constant percent weight yield of about 32% in a continuous manner. The series of three slices were then alternatively packaged into six metal containers, about 300 slices per container. The containers were then subjected to maximum vacuum, back-filled with nitrogen and sealed. By this process of selection, each of the six containers included slices representing substantially an entire bacon slab. One container was selected for analysis. The results of the analysis indicated the containerized product had a water activity of .81, a percent brine level of 15.9% and the individual bacon slices had salt contents of about 3.8% by weight. Moreover, containers held in storage for six months at room temperature exhibited no microbial growth.

Obviously, many modifications and variations of the invention as hereinbefore set forth may be made without departing from the spirit and scope thereof, and, therefore, only such limitations should be imposed as are indicated in the appended claims.

We claim:

1. An improved process for producing a pre-cooked sliced bacon product that is shelf stable at ambient temperature yet has only a palatable level of sodium chloride throughout each slice of said product, said method comprising: cooking bacon slices, sliced from at least one bacon slab cured and prepared in a conventional manner, to a constant percent weight yield of between about 30–40%, whence only some of said slices from each slab have a water activity of .86, and less, and a percent brine level of at least 13%; selecting an equal plurality of the cooked bacon slices from each flank, center, center and butt quadrant of at least one bacon slab; and packing and sealing the selected slices in a container in the absence of air so as to inhibit mold growth, and whereby after a holding period of time sufficient to reach an equilibrium all of the resultant containerized product slices exhibit a water activity of less than about .86 maximum and a percent brine level of at least 13%, each of the bacon slices of said product having below about 4%, by weight, sodium chloride.

2. The method of claim 1 wherein said bacon slices are cooked to a constant percent yield of between about 32% to 35%.

3. The method of claim 2 wherein said resultant containerized product has a water activity of about .80 to about .85 and a percent brine level of about 13.0% to 16.0%.

4. The method of claim 1 wherein said bacon slices are obtained from bacon slabs conventionally prepared and cured with a 100° saturated brine pickling solution, said bacon slabs being pumped with said pickling solution to about 110%–120% green weight.

5. The method of claim 1 wherein said bacon slices are cooked in a continuous manner by exposing said slices to infrared heat for a time period sufficient to provide said constant percent weight yield.

6. The method of claim 1 wherein about 300 cooked slices are selected from at least one bacon slab and packaged in a single container, said slices representing substantially a whole bacon slab.

* * * * *